United States Patent Office 3,522,199
Patented July 28, 1970

3,522,199
AQUEOUS DISPERSIONS CROSS-LINKED IN AN ALKALINE MEDIUM, AND SHAPED ARTICLES PRODUCED THEREFROM
Wolfgang Keberle and Erwin Mueller, Leverkusen, Germany, assignors to Farbenfabriken Bayer Aktiengellschaft, Leverkusen, Germany, a corporation of Germany
No Drawing. Filed June 7, 1967, Ser. No. 644,071
Claims priority, application Germany, June 8, 1966, F 49,425
Int. Cl. C08g $51/24, 22/00$; B44d $1/44$
U.S. Cl. 260—29.2      8 Claims

ABSTRACT OF THE DISCLOSURE

Aqueous dispersions are prepared from NCO terminated prepolymers prepared by reacting an excess of an organic polyisocyanate and an organic compound containing active hydrogen atoms that are reactive with isocyanate groups and a compound containing at least one active hydrogen atom and at least one sulfuric acid semi-ester group present in the form of an alkali metal salt or ammonium salt. These dispersions can be rendered more basic by the inclusion of basic materials and coated onto suitable substrates to obtain water resistance, solvent resistance, films, foils and adhesives.

---

This invention relates to aqueous dispersions, a method of preparation and articles produced therefrom. More particularly, it relates to emulsion-free aqueous dispersions.

Various processes are already known for the preparation of polyurethane dispersions. Thus, for example, polyurethane compositions or isocyanate group containing prepolymers, can be dispersed in water in the presence of emulsifiers. Such dispersions may in some cases also contain relatively large quantities of organic solvents. Other processes for the preparation of dispersible polyurethane compositions rely on the introduction of salt-type groups, using for example, chain lengthening agents which contain salt-type groups or groups capable of salt formation. The preparation of polyurethane dispersions by subsequent modification of preformed polyurethane compositions which are free from salt-type groups, whereby salt groups are incorporated in these polyurethane compositions so that the compositions become dispersible, has also been described. With these polyurethane compositions which contain salt groups it is possible to prepare aqueous anionic or cationic dispersions which are free from emulsifier and which can thus be prepared free from solvent. Such dispersions contain polyurethane compositions which are built up from high molecular weight compounds which contain reactive hydrogen atoms, polyisocyanates and if desired chain lengthening agents which contain reactive hydrogen atoms.

The salt-type groups in these polyurethane compositions, for example, salt groups which contain carboxylate or sulfonate groups, phosphonate groups, or quaternary ammonium groups, are either strongly bound to the polyurethane chain, or form cross-linking members of the polyurethane chain which cannot be split off by treatment with acids or alkalies. Owing to the presence of the salt-type groups, these polyurethane compositions have hydrophilic centers which enable them to be converted into the aqueous phase without the use of emulsifier. Dispersion or colloidal distributions which may, for example, be converted into sheet structures, are thus formed. Although these polyurethane resins are largely hydrophobic in character, due to the presence of the salt-type centers they have a certain hydrophilic tendency which may, in some cases, cause them to swell in water and take up water. The tendency to swell in water and to take up water often is undesirable, especially when one wishes to obtain water-proof coatings or bonds from the dispersions.

It is therefore an object of this invention to provide improved polyurethane dispersions. It is another object of this invention to provide improved polyurethane dispersions free of emulsifiers. It is still another object of this invention to provide an improved method of preparing polyurehtane dispersions. It is still another object of this invention to provide polyurethane dispersions from polyurethane polymers containing salt-type groups that aid in the dispersion of the polyurethane in aqueous solution and split off during shaping of the desired article. It is a further object of this invention to provide polyurethane dispersions which can be shaped into suitable articles having resistance to swell in water. It is still a further object of this invention to provide a method of preparing coatings or adhesives from dispersions which exhibit water-proof properties.

The foregoing objects and others that become apparent from the following description are accomplished in accordance with the invention, generally speaking, by providing aqueous dispersions free of emulsifiers and which can be cross-linked in an alkaline medium by reacting an NCO terminated prepolymer prepared from an organic compound containing active hydrogen atoms which are reactive with NCO groups and having a molecular weight of from about 300 to about 20,000 with an organic polyisocyanate and reacting this prepolymer with an organic compound containing at least one active hydrogen atom that is reactive with NCO groups and at least one sulfuric acid semi-ester group present in the form of an alkali metal salt or ammonium salt, the reaction product being dispersed in water. In the preparation of articles of manufacturer from such dispersions the sulfate ester radical is split off by means of alkali. The hydrophilic nature of the polymers, which is a srious disadvantage, is thus overcome.

The removal of the salt-type groups which carry out the emulsifier function has in addition, the effect of causing cross-linking, so that the polyurethane resins, on being treated with alkalies and subjected to heat in the shaping process become insoluble in the usual solvents or only swell in them.

The invention thus provides a process for the preparation of emulsifier-free aqueous polyurethane dispersions which are capable of being cross-linked in an alkaline medium, from polyurethane compositions prepared by the isocyanate polyaddition process from compounds containing several active hydrogen atoms and having a molecular weight of 300 to 20,000 preferably 600 to 4,000, polyisocyanates and, if desired chain lengthening agents which contain reactive hydrogen atoms as well as compounds having at least one group reactive with isocyanate groups and one salt-type group, and shaped articles produced therefrom, which process is characterized in that compounds having at least one group reactive with isocyanate groups, which group contains at least one reactive hydrogen atom and which contain at least one sulfuric acid semi-ester group —OSO₃Me (Me=Li, Na, K or NR₄ where R=H or a lower alkyl radical such as methyl, ethyl, butyl, isobutyl, hexyl and the like) are used in such a quantity that the proportion by weight of the group —O—SO₃$^{(-)}$ amounts to 0.05 to 8 percent by weight, preferably 0.5 to 4 percent of the polyurethane compositions, the dispersions in the alkaline medium are subsequently being dried by a process which at the same time shapes them and the shaped articles are subjected to a heat treatment.

The compounds to be used according to the invention which have at least one active hydrogen atom which is reactive with isocyanate groups and at least one sulfuric acid semi-ester group present in the form of alkali metal salt or ammonium salt, preferably contain in addition at least one primary or secondary amino group, so that the sulfuric acid semi-ester group is preferably in the β or γ-position to such an amino group. Any suitable compound may be used, such as, for example, aminoethanolsulfuric acid, aminodiethanolsulfuric acid, ethylene diaminoethanolsulfuric acid, aminopropanolsulfuric acid, hexamethylene diamine-N,N'-diethanolsulfuric acid, hexamethylene diaminoethanolsulfuric acid, aminobutanolsulfuric acid, aminopentanolsulfuric acid, hexamethylenediamine-butanol sulfuric acid, glycerolsulfuric acid, hydroxyethanolsulfuric acid, γ - hydroxypropanolsulfuric acid, α-hydroxybutanolsulfuric acid and the like.

One may obtain the compounds to be used according to the invention and which have at least one sulfuric acid semi-ester group from the corresponding alcohols by sulfation, for example with concentrated sulfuric acid, chlorosulfonic acid or oleum, if desired in the presence of solvents or diluents such as water, carbon tetrachloride, nitrobenzene or from concentrated sulfuric acid at temperatures between 0 and 250° C. Suitable methods of preparation are described, for example, in Journal of American Chemistry, Soc. 57 (1935), 2328; 69 (1947); 1540; 75 (1953), 4101.

The sulfuric acid semi-esters which are, in some cases, obtained in the form of hydrogen sulfate or hydrogen chlorides, are present as sulfobetaines when aminoalcohols are used as starting materials, and these sulfobetaines are introduced into the reaction after conversion into the alkali metal salt form and after separation of any alkali metal sulfates or alkali metal chlorides which may be formed. Alternatively they may be used as mixtures with the alkali metal sulfates or alkali metal chlorides which are formed.

Hydroxides, oxides, carbonates or hydrocarbonates of the alkali metals are used for the conversion into the salt form. Any suitable compound, such as, for example, aqueous sodium hydroxide, aqueous potassium hydroxide, sodium carbonate, potassium carbonate, sodium bicarbonate, potassium bicarbonate, lithium carbonate, lithium hydroxide and ammonia and primary, secondary and tertiary amines such as triethylamine, methylamine, trimethylamine, propylamine, isopropylamine, butylamine and the like may be used.

Starting materials for the polyurethane compositions are broadly described in the art. As examples, there are to be listed the compounds mentioned in French patent specification 1,416,463 and in Belgian Pat. 673,432. These compounds may, in principle, be used as materials for use in the manufacture of the polyurethane composition of the present invention.

In the preparation of the NCO terminated prepolymer used in reaction with the sulfuric acid semi-ester, any suitable active hydrogen containing compound, having a molecular weight of from about 300 to about 20,000 and preferably from about 600 to about 4,000 may be used such as, for example, hydroxyl polyesters, polyhydric alkylene ethers, polyhydric polythioethers, polyacetal and the like. The hydroxyl number of these materials is preferably from about 10 to about 100 and more preferably from about 50 to about 70.

Any suitable hydroxyl polyester may be used such as, for example, the reaction product of a polycarboxylic acid and a polyhydric alcohol. Any suitable polycarboxylic acid may be used in the preparation of the hydroxyl polyester such as, for example, adipic acid, succinic acid, sebacic acid, suberic acid, oxalic acid, methyl adipic acid, glutaric acid, pimelic acid, azelaic acid, phthalic acid, terephthalic acid, isophthalic acid, thiodipropionic acid, maleic acid, fumaric acid, citraconic acid, itaconic acid and the like. Any suitable polyhydric alcohol may be used in the reaction with the polycarboxylic acid to form a polyester such as, for example, ethylene glycol, propylene glycol, butylene glycol, neopentyl glycol, amylene glycol, hexanediol, bis-(hydroxymethylcyclohexane) and the like. Of course, the hydroxyl polyester may contain urethane groups, urea groups, amide groups, chalkogen groups and the like. Thus, the hydroxyl terminated polyester includes, in addition to hydroxyl terminated polyesters, also hydroxyl terminated polyester amides, polyester urethanes, polyetheresters and the like. Any suitable polyester amide may be used such as, for example, the reaction product of a diamine or an amino alcohol with any of the compositions set forth for preparing polyesters. Any suitable amine may be used such as, for example, ethylene diamine, propylene diamine, tolylene diamine and the like.

Any suitable amino alcohol such as, for example, β-hydroxy ethyl-amine and the like may be used. Any suitable polyester urethane may be used such as, for example, the reaction of any of the above-mentioned polyesters or polyester amides with a deficiency of an organic polyisocyanate to produce a compound having terminal hydroxyl groups. Any of the polyisocyanates set forth hereinafter may be used to prepare such compounds.

Any suitable polyetherester may be used as the organic compound containing terminal hydroxyl groups such as, for example, the reaction product of an ether glycol and a polycarboxylic acid such as those mentioned above, with relation to the preparation of polyesters. Any suitable ether glycol may be used such as, for example, diethylene glycol, triethylene glycol, 1,4-phenylene-bis-hydroxy ethyl ether, 2,2'-diphenyl propane 4,4'-bis-hydroxy ethyl ether and the like.

Any suitable polyhydric polyalkylene ether may be used such as, for example, the condensation product of an alkylene oxide with a small amount of a compound containing active hydrogen containing groups such as, for example, water, ethylene glycol, propylene glycol, butylene glycol, amylene glycol, trimethylol propane, glycerine, pentaerythritol, hexanetriol and the like. Any suitable alkylene oxide condensate may also be used such as, for example, the condensates of ethylene oxide, propylene oxide, butylene oxide, amylene oxide and mixtures thereof. The polyalkylene ethers prepared from tetrahydrofuran may be used. The polyhydric polyalkylene ethers may be prepared by any known process such as, for example, the process described by Wurtz in 1859 and in the "Encyclopedia of Chemical Technology," volume 7, pages 257–262, published by Interscience Publishers in 1951 or in U.S. Pat. No. 1,922,459.

Any suitable polyhydric polythioether may be used such as, for example, the reaction product of one of the aforementioned alkylene oxides used in the preparation of the polyhydric polyalkylene ether with a polyhydric thioether such as, for example, thiodiglycol, 3,3'-dihydroxy propyl sulfide, 4,4'-dihydroxy butyl sulfide, 1,4-(β-hydroxy ethyl)phenylene dithioether and the like.

Any suitable polyacetal may be used such as, for example, the reaction product of an aldehyde with a polyhydric alcohol. Any suitable aldehyde may be used such as, for example, formaldehyde, paraldehyde, butyraldehyde and the like. Any of the polyhydric alcohols mentioned above with relation to the preparation of hydroxyl polyesters may be used.

Any suitable organic diisocyanate may be used in reaction with the organic compound containing active hydrogen atoms such as, for example, ethylene diisocyanate, ethylidene diisocyanate, propylene diisocyanate, butylene diisocyanate, hexamethylene diisocyanate, cyclopentylene-1,3-diisocyanate, cyclohexylene-1,4 - diisocyanate, cyclohexylene-1,2-diisocyanate, 2,4-toluylene diisocyanate, 2,6-toluylene diisocyanate, dimeric toluylene diisocyanate, 4,4′-diphenylmethane diisocyanate, 2,2-diphenylpropane-4,4′-diisocyanate, p-phenylene diisocyanate, m-phenylene diisocyanate, xylylene diisocyanate, 1,4-naphthylene diisocyanate, 1,5-naphthylene diisocyanate, diphenyl-4,4′-diisocyanate, azobenzene - 4,4′ - diisocyanate, diphenylsulphone - 4,4′ - diisocyanate, dichlorohexamethylene diisocyanate, furfurylidene diisocyanate, 1-chlorobenzene-2,4-diisocyanate and the like. It is preferred to use aliphatic diisocyanates to obtain polyurethane compositions that will not discolor in the light.

Any suitable chain extending agent containing active hydrogen atoms which are reactive with NCO groups and having a molecular weight less than about 300 may be used such as, for example, ethylene glycol, propylene glycol, butylene gycol, 1,4-butanediol, butenediol, butynediol, xylylene glycol, amylene glycol, neopentyl glycol, 2,3-butanediol, 1,4-phenylene-bis($\beta$-hydroxy ethyl ether), 1,3-phenylene-bis-($\beta$-hydroxy ethyl ether), bis-(hydroxy methyl-cyclohexane), hexanediol, diethylene glycol, dipropylene glycol and the like; polyamines such as, for example, ethylene diamine, propylene diamine, butylene diamine, hexamethylene diamine, cyclohexylene diamine, phenylene diamine, tolylene diamine, xylylene diamine, 3,3′-dichlorobenzidene, 3,3′-dinitrobenzidene, 4,4′-methylene-bis(2-chloroaniline), 3,3-dichloro-4,4′ - biphenyl diamine, 2,6-diamino pyridine, 4,4′-diamino diphenyl methane, and the like; alkanol amines such as, for example, ethanol amine, aminopropyl alcohol, 2,2-dimethyl propanol amine, 3-amino cyclohexyl alcohol, p-amino benzyl alcohol and the like; water, hydrazine, substituted hydrazines such as, for example, N,N′-dimethyl hydrazine, 1,6 - hexamethylene-bis-hydrazine, carbodihylrazide, hydrazides of dicarboxylic acids and disulfonic acids such as adipic acid dihydrazide, oxalic acid dihydrazide, isophthalic acid dihydrazide, thiodipropionic acid dihydrazide, tartaric acid dihydrazide, 1,3-phenylenedisulfonic acid dihydrazide, omega-amino-capronic acid dihydrazide, gamma-hydroxy butyric hydrazide, bis-semi-carbazide, bis-hydrazine carbonic esters of glycols such as any of the glycols heretofore mentioned and the like.

In order to vary such properties as the impermeability to water, overall feel surface qualities and gloss effects of impregnations, paints, coatings and adhesions containing the products of the process, carbofunctional polysiloxanes containing reactive hydrogen atoms and having a molecular weight of about 300 to 20,000, preferably 600 to 4,000 may, if desired, be used instead of, or admixed with, the above-mentioned higher molecular weight compounds containing reactive hydrogen atoms having a molecular weight of 300 to 20,000.

Any suitable carbofunctional polysiloxanes may be used such as described in French patent specification No. 1,291,937, in German Auslegeschrift No. 1,114,632 and in U.S. applications Ser. Nos. 550,895 and 602,521.

These polysiloxanes which contain reactive hydrogen atoms correspond to the general formula of:

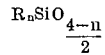

in which R represents aliphatic, cycloaliphatic or aromatic hydrocalbon radicals which may be substituted by inert groups, the radicals represented by R being preferably methyl or phenyl groups, and $n$ has a value of from 1 to 3. At least once in the molecular R is a carbofunctional organic radical. This radical may be given the Formula —R′—Y wherein R′ is a divalent aliphatic hydrocarbon radical having 1 to 6 carbon atoms, and which may be interrupted by ether or thioether groups, and Y is, for example, a hydroxyl, mercapto or carboxyl group, or a primary or secondary amino group.

The following are examples of such carbofunctional radicals:

| | |
|---|---|
| Hydroxymethyl | —CH$_2$OH. |
| Hydroxybutyl | —(CH$_2$)$_4$OH. |
| $\beta$-Hydroxyethyl-oxymethyl | —CH$_2$—O—CH$_2$—CH$_2$—OH. |
| $\beta$-Hydroxyethyl-mercaptomethyl | —CH$_2$—S—CH$_2$—CH$_2$—OH. |
| $\beta$-Y-dihydroxylpropyl-mercaptomethyl | —CH$_2$—S—CH$_2$—CHOH —CH$_2$OH. |
| Mercaptomethyl | —CH$_2$SH. |
| $\beta$-Mercaptoethyl-mercaptomethyl | —CH$_2$—S—CH$_2$—CH$_2$—SH. |
| $\beta$-Carboxyethyl | —CH$_2$—CH$_2$—COOH. |
| Aminomethyl | —CH$_2$—NH$_2$. |
| $\alpha$-Aminobutyl | —(CH$_2$)$_4$—NH$_2$. |
| n-Butylaminomethyl | —CH$_2$—NH—C$_4$H$_9$. |

These organopolysiloxanes may be prepared by known processes. For example, hydroxymethylpolysiloxanes, are especially suitable for use in the process according to the invention and can be prepared by direct reaction of bromomethylpolysiloxanes with alcoholic potassium hydroxide. 4-aminobutylpolysiloxanes are prepared by hydrogenation of the corresponding nitriles which are easily obtainable. The corresponding carboxyl derivatives are obtained by saponification of these cyanoalkyl silicon compounds. Aminomethyl siloxanes are obtained by amination of halogenomethyl silicon compounds using ammonia or primary amines.

In many cases, the functional groups are first introduced into low molecular weight siloxanes before the products thereby obtained are converted into higher molecular weight polysiloxanes by the equilibration reaction.

Polysiloxanes having a molecular weight of 194 to 20,000 and especially 500 to 6,000 are preferably used. Furthermore, substantially linear polysiloxanes used are preferably linear and contain terminal hydroxyl or amino groups.

The following are examples of suitable polysiloxanes:

HO—CH$_2$—Si(CH$_3$)$_2$—O
[Si(CH$_3$)$_2$—O]$_{12}$—Si(CH$_3$)$_2$—CH$_2$OH

HO—CH—CH$_2$—O—CH$_2$—[Si(CH$_3$)$_2$—O]$_{11}$—Si(CH$_3$)$_2$—O—CH—CH$_2$—OH
   |                                                    |
   CH$_3$                                               CH$_3$

HO—CH$_2$—Si(CH$_3$)$_2$—O—Si(CH$_3$)$_2$—CH$_2$—OH

HO—CH$_2$—Si(CH$_3$)$_2$—O—
[Si(CH$_3$)$_2$—O]$_{60}$—Si(CH$_3$)$_2$—CH$_2$—OH $n$—C$_4$H$_9$—NH—CH$_2$—Si(CH$_3$)$_2$—O—
[Si(CH$_3$)$_2$—O]$_{18}$—Si(CH$_3$)$_2$—CH$_2$—NH—$n$—C$_4$H$_9$

Compounds mentioned in Belgian Pat. No. 673,432 as having at least one hydrogen reactive with isocyanate groups and at least one anionic salt-type group or group capable of salt formation in addition to the compounds to be used according to the invention, which have at least one group reactive with isocyanate groups, which group contains at least one reactive hydrogen atom, and at least one sulfuric acid semi-ester group present in the form of alkali metal salt or ammonium salt.

Examples of these compounds are, aliphatic and aromatic amino- and diamino carboxylic acids, -sulfonic acids and -phosphonic acids. Aliphatic acids, such as lysin and ornithine, taurine, methyltaurine, glycocoll, aminopropanephosphonic acid, colamine phosphoric acid and the products of addition of propane- and butanesultone and (meth)acrylic acid to aliphatic diamines such as ethylene diamine or 1,6-diamonohexane are preferably used.

Examples of the salt-forming countercomponent which reacts with the group capable of salt formation to form a salt are also mentioned in Belgian Pat. No. 673,432.

The hydroxides and carbonates of monovalent metals, organic amines and ammonia are preferably used.

In order to prepare the aqueous polyurethane dispersions free from emulsifier and capable of being cross-linked in an alkaline medium, a prepolymer containing isocyanate groups from the compound containing reactive hydrogen atoms and having a molecular weight of 300 to 20,000, preferably 600 to 4,000, the polyisocyanates and the chain lengthening agents if used is prepared. This prepolymer is then reacted in an organic solvent with the compound to be used according to the invention, which compound contains at least one active hydrogen atom that is reactive with NCO groups and at least one sulfuric acid semi-ester group present in the form of an alkali metal salt or ammonium salt. The resulting, predominantly linear or branched, high molecular weight, anionic polyurethanes are converted into the aqueous phase by the addition of water and the organic solvent is removed at the same time or afterwards.

Alternatively, an aqueous solution of the compound containing at least one reactive hydrogen atom and at least one sulfuric acid semi-ester group present in the form of an alkali metal salt or ammonium salt is introduced into the reactive vessel and the prepolymer containing free isocyanate groups is then stirred in. It is also possible to add the total quantity of water together with the compound containing at least one active hydrogen atom and at least one sulfuric acid semi-ester group present in the form of an alkali metal salt or ammonium salt.

Any suitable low boiling organic solvent for the prepolymer may be used, such as, acetone, tetrahydrofuran, methyl ethyl ketone and tertiary butanol and the like. However, low boiling solvents which are immiscible with water such as, for example, benzene, methylene chloride and the like also may be used.

Any suitable solvent for the compound containing at least one active hydrogen atom, and at least one sulfuric acid semi-ester group present in the form of an alkali metal salt or ammonium salt may be used, such as low boiling alcohols, such as methanol, ethanol or water, if desired admixed with other organic solvents.

The prepolymer containing free isocyanate groups is preferably prepared at elevated temperatures. When aliphatic polyisocyanates are used, temperatures between 110 and 130° C. are preferably used, while with aromatic diisocyanates, temperatures of 60 to 100° C. are generally sufficient.

The quantity of polyisocyanates is preferably in a slight excess of isocyanate groups over that necessary to react with all the groups capable of reacting with isocyanate groups.

The ratio of isocyanate groups to groups reactive with isocyanate groups will generally be not greater than about 1.3:1.

When the melt has cooled, the prepolymer is taken up in an organic solvent and the compound containing at least one active hydrogen atom, and at least one sulfuric acid semi-ester group present as alkali metal salt or ammonium salt is added at 20 to 80° C.

The quantity of sulfate groups, —O—$SO_3$, in the polyurethane is about 0.05 to about 8, preferably about 0.5 to about 4 percent by weight. The quantity of compound carrying sulfate groups should be chosen accordingly. The quantity of sulfate groups can be varied within wide limits, but it should not fall below the lower limit because otherwise the stability of the dispersions which are as a rule prepared without the use of auxiliary agents such as emulsifiers, dispersing agents or swelling agents will be impaired.

In order to convert the solutions into the aqueous phase, the organic solvent is removed by distillation or blowing out, preferably at temperatures between about 30 and about 80° C. The solvent is preferably removed by evaporation in vacuo.

In this way dispersions are obtained in the form of non-sedimenting latices of low to high viscosity, having an average particle size of between about 0.02 and about 1.0 micron, preferably about 0.05 to about 0.2 micron, and a solids content of from about 20 to about 60 percent by weight.

According to the invention, shaped articles e.g., in the form of sheet structures such as films, coatings, impregnations or bonds are obtained from the dispersions for example, by first making the dispersions alkaline and then partly drying them in a shaping process, and then subjecting them to heat treatment. The drying may, of course, also be carried out together with the heat treatment in a single operation.

These dispersions are stable and can be stored and transported even after they have been adjusted to alkaline pH values and can be worked up by a shaping process at any subsequent time.

The extent of cross-linking in the cross-linking process is determined by the quantity of sulfate groups present which can be split off. The greater the desired density of cross-linking, the greater will be the sulfate group content. The conditions of cross-linking may vary according to the structure of the polyurethane. The minimum conditions are easily determined by a preliminary test for each individual case. For this purpose, samples of the dispersion are adjusted to pH 9 to 12 with alkalies or alkali carbonate solutions, poured on to supports and dried at temperatures of 80, 100, 120 and 140° C. An indication that cross-linking has set in may be given by insolubility in 80 to 90 percent aqueous tetrahydrofuran or acetone or in dimethylformamide.

Cross-linking is favored by high pH values, preferably pH 9 to 12, elevated temperatures, high urethane group content and as far as possible, the presence of more suitable acceptor groups for cross-linking than urethane groups, e.g. urea, carbonamide or hydrazide groups. Cross-linking of the layers, which may be moist or may already have been subjected to preliminary drying, is carried out at from about 80 to about 140° C., preferably from about 100 to about 120° C. by after heating for about 2 to about 60 and preferably about 15 to about 30 minutes.

When preparing the polyurethane composition, one should only use components which do not contain any groups or chain members which can be split off with alkalies. On the other hand, it is preferred to use weak alkalies such as carbonates or bicarbonates for alkaline splitting off of the sulfate groups, and for cross-linking of polyurethane compositions which have been built up from polyesters. In the case of polyester polyurethanes, however, one may also use strong alkalies such as alkali metal hydroxides.

The products of the process have good resistance to water and oil, and are used mainly as coatings and impregnations for all sorts of different substrates, as bonding agents and as adhesives for elastic films and foils.

The dispersions may be blended with polymer or copolymer dispersions of the same charge. For example, dispersions of vinyl chloride, ethylene, styrene, butadiene, vinylidene chloride, vinyl acetate, acrylate or acrylonitrile may be used. Fillers, plasticizers, pigments carbon black, aluminum and dispersions of clay, asbestos or tar may also be incorporated into the dispersions.

The invention is further illustrated but not limited by the following examples in which parts are by weight unless oherwise specified.

EXAMPLE 1

About 210.5 parts of a polyester of adipic acid, hexane-1,6-diol and neopentyl glycol (molar ratio 30:22:12; OH number 67) are dehydrated at about 120° C. and about 12 mm. Hg for about 30 minutes, and about 33.5 parts of hexane-1,6-diisocyanate are then added and the mixture is reacted for about 2 hours at about 120° C. The melt is taken up in about 700 parts by volume of acetone at about 55° C. and reacted at about 55° C. with a solution of about 8.8 parts aminoethanol sulfuric acid semi-ester and about 3.5 parts potassium hydroxide in about 80 parts by volume of water. After termination of the reaction, about 500 parts by volume of water are added. The reaction mixture is then stirred until it becomes homogeneous. After removal of the acetone by distillation in vacuo, a stable, milky white dispersion is obtained which has a solids content of 34 percent and a pH of 6. The dispersion dries to form soft, slightly tacky coatings which are soluble in 80 percent aqueous tetrahydrofuran and in dimethylformamide.

About 10 parts by volume portions of the dispersions are adjusted to pH 10 with 5 percent sodium hydroxide or soda solution and poured on to glass plates. The films in each case are partly dried at about 70° C. for about 10 minutes and then heated at about 100° C. for about 30 minutes. The nontacky foils obtained are clear, elastic and of high tensile strength. Furthermore, they are insoluble in dimethylformamide.

EXAMPLE 2

A prepolymer is obtained from about 421 parts of the polyester used in Example 1 and about 66 parts of hexane-1,6-diisocyanate by reacting for about 2 hours at about 120° C. After cooling the prepolymer formed to about 55° C., it is taken up in about 1400 parts by volume of acetone. A solution of about 28 parts of sodium ethylene diamine ethanol sulfate in about 150 parts by volume of water is added to the solution of prepolymer in acetone. After termination of the reactions, about 1000 parts by volume of water are added. The mixture is then stirred until the streakiness has disappeared. The acetone is drawn off in vacuo at from about 55 to about 60° C. A purely aqueous, 38 percent dispersion is obtained which is milky white in color and which dries to form clear foils of high tensile strength which are soluble in cold dimethylformamide and swell in water.

The dispersion is made alkaline with 5 percent soda solution and poured on to glass supports. It is then heated at about 110° C. for about 30 minutes. When the coating has been stripped from the glass support, a nontacky, clear transparent foil having high tensile strength and elasticity is obtained. The foil is insoluble in dimethylformamide and in 80 percent aqueous acetone.

The coil which has been tempered in the alkaline medium has much less tendency to swell in water than the untreated foil. The waterproofing properties of the foil are considerably enhanced.

EXAMPLE 3

The prepolymer obtained at about 120° C. by reacting about 210.5 parts of the polyester used in Example 1 and about 40.0 parts of hexane-1,6-diisocyanate, is dissolved in about 700 parts by volume of acetone, and about 102 parts of a solution of about 12.9 parts of sodium ethylene diamine-N-ethanolsulfate in methanol are added thereto at about 25° C. The mixture is stirred for a short time and about 550 parts by volume of water are then added. After removal of the acetone by distillation, a milky dispersion having a solids content of 33 percent and pH of 5 to 6 is obtained. The dispersion can be dried to form clear transparent, elastic foils of high tensile strength. The dispesrion is adjusted to pH 10 with 10 percent soda solution and poured on to a glass support to form a film. The film is dried at about 120° C. for about 30 minutes and then stored in dimethylformamide. The foil does not dissolve. It merely swells slightly.

EXAMPLE 4

A prepolymer prepared by reacting about 210.5 parts of the polyester used in Example 1 with about 52 parts of hexane-1,6-diisocyanate at about 120° C. is dissolved in about 700 parts by volume acetone, and a solution of about 25.8 parts sodium ethylene diamine-N-ethanolsulfate in about 200 parts by volume methanol is added at about 35° C. After termination of the reaction, about 550 parts by volume of water is rapidly added dropwise into the reaction mixture. The mixture is then stirred until it has become homogeneous and nonstreaky. After removal of the acetone by distillation in vacuo, an opaque 35 percent dispersion of pH 6 to 7 remains behind. Clear, elastic foils of high tensile strength are obtained from this dispersion on drying. When stored in water, they undergo considerable swelling and decompose on boiling.

However, if the dispersion is adjusted to a pH 10 with 10 percent soda solution, foils are obtained after thermal cross-linking (30 minutes at 120° C.) which undergo relatively slight swelling when stored in water and are substantially stable in boiling water.

It should be understood that any of the active hydrogen containing compounds, organic isocyanates, compounds containing active hydrogen atoms as well as sulfuric acid semi-ester groups, solvents or alkali compounds may be used in place of the corresponding compounds of the examples.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. A process for preparing an aqueous dispersion of a polymer which comprises preparing an NCO terminated prepolymer by reacting an excess of an organic polyisocyanate with a compound containing at least two hydrogen atoms which are reactive with NCO groups and reacting the prepolymer in an organic solvent with a second compound containing (1) at least one active hydrogen atom that is reactive with NCO groups and (2) at least one sulfuric acid semi-ester group in the form of an alkali metal salt or an ammonium salt, the amount of the second compound being sufficient to yield from about 0.05 to about 8 percent by weight of sulfate groups in the polymer, adding water, removing the organic solvent and adjusting the pH of the dispersion to from about 9 to about 12.

2. The process of claim 1 wherein the dispersion is shaped and dried at temperatures of from about 80° to about 140° C. for from about 2 to about 60 minutes to cross-link the polymer.

3. The process of claim 1 wherein the second compound is introduced as an aqueous solution.

4. The process of claim 3 wherein the total quantity of water present in the dispersion is added with the second organic compound.

5. The process of claim 1 wherein the prepolymer is prepared by reacting an aliphatic polyisocyanate with the active hydrogen containing compound at a temperature of between about 110° and about 130° C.

6. The process of claim 1 wherein the prepolymer is prepared by reacting an aromatic diisocyanate with the active hydrogen containing compound at a temperature of between about 60° and 100° C.

7. The process of claim 1 wherein the ratio of isocyanate groups to groups reactive with isocyanate groups is not greater than about 1.3:1.

8. The process of claim 1 wherein the second organic compound is added at temperatures of from about 20° to about 80° C.

References Cited

UNITED STATES PATENTS

| 2,988,538 | 6/1961 | Thoma et al. | 260—29.2 |
| 3,264,134 | 8/1966 | Vill et al. | 260—29.2 |
| 3,415,768 | 12/1968 | Dieterich et al. | 260—29.2 |

MURRAY TILLMAN, Primary Examiner

J. C. BLEUTGE, Assistant Examiner

U.S. Cl. X.R.

260—77.5, 75, 33.4, 824, 859, 37, 40; 117—62.1, 62.2